United States Patent [19]
Tao et al.

[11] Patent Number: 5,838,599
[45] Date of Patent: Nov. 17, 1998

[54] METHOD AND APPARATUS FOR NONLINEAR EXPONENTIAL FILTERING OF SIGNALS

[75] Inventors: Kuoting Mike Tao, Campbell; Ramesh Balakrishnan, Palo Alto; Xiaohua George He, Menlo Park, all of Calif.

[73] Assignee: Measurex Corporation, Cupertino, Calif.

[21] Appl. No.: 713,473

[22] Filed: Sep. 13, 1996

[51] Int. Cl.$^6$ .................................................. G06F 17/10
[52] U.S. Cl. .......................... 364/724.014; 364/724.011
[58] Field of Search ................... 364/724.014, 724.011, 364/150, 151

[56] References Cited

U.S. PATENT DOCUMENTS

| | | | |
|---|---|---|---|
| 3,610,899 | 10/1971 | Dahlin | 235/151.35 |
| 4,346,433 | 8/1982 | Rutledge | 364/162 |
| 4,368,510 | 1/1983 | Anderson | 364/151 |
| 4,407,013 | 9/1983 | Arcara et al. | 364/149 |
| 4,423,594 | 1/1984 | Ellis | 60/39.28 |
| 4,578,747 | 3/1986 | Hideg et al. | 364/151 |
| 4,602,326 | 7/1986 | Kraus | 364/158 |
| 4,646,226 | 2/1987 | Moon | 364/176 |
| 4,707,779 | 11/1987 | Hu | 364/148 |
| 4,805,126 | 2/1989 | Rodems | 364/571.01 |
| 4,814,968 | 3/1989 | Fukumoto | 364/150 |
| 4,893,262 | 1/1990 | Kalata | 364/567 |
| 5,121,332 | 6/1992 | Balakrishnan et al. | 364/471 |
| 5,150,317 | 9/1992 | Countryman | 364/724.011 |
| 5,337,264 | 8/1994 | Levien | 364/724.011 |
| 5,349,546 | 9/1994 | Sharman | 364/724.014 |
| 5,539,634 | 7/1996 | He | 364/158 |

OTHER PUBLICATIONS

"A Linear Programming Approach to Constrained Multivariable Process Control" by C. Brosilow et al., Control and Dynamic Systems, vol. 27, System Identification and Adaptive Control, 1988, Academic Press, Inc., pp. 141, 148 and 149.

"A Simple Adaptive Smith–Predictor for Controlling Time–Delay Systems" by A. Terry Bahill, Control Systems Magazine, May 1983, pp. 16–22.

"Theory and Problems of Feedback and Control Systems" by Joseph J. Distefano, III, Ph.D et al, 1967, McGraw–Hill, Inc., Chapter 2, pp. 13 and 14.

"Multivariable Internal Model Control For a Full–Scale Industrial Distillation col.," by J.M. Wassick and R. Lal Tummala, IEEE Control Systems Magazine, 1989, pp. 91–96.

"Method For Automatic Adaptation of the Time Constant for a First Order Filter", from the Industrial and Engineering Chemistry Research, No. 29, 1991, pp. 275–277.

Primary Examiner—David H. Malzahn
Attorney, Agent, or Firm—Burns, Doane, Swecker & Mathis, LLP

[57] ABSTRACT

The present invention is directed to a method and apparatus for filtering a signal of a control and/or signal processing system in a manner which achieves both rapid tracking of signal transients (e.g., step changes in the signal) and heavy filtering of noise during steady-state operation. In accordance with exemplary embodiments, nonlinear features are combined with a conventional exponential filter to achieve both of these objectives. Exemplary embodiments are easy to use in a control and/or signal process system, and perform in a highly accurate manner. For example, in accordance with exemplary embodiments, a filter is configured with a deadband component which constitutes the sole adjustable component of the filter.

18 Claims, 5 Drawing Sheets

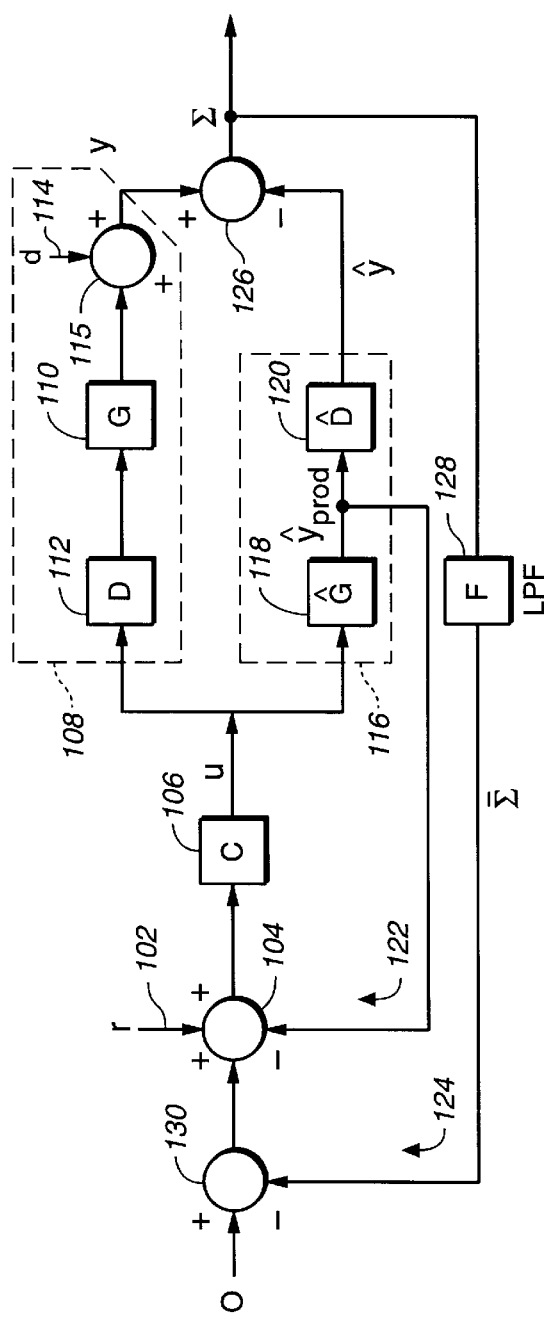
FIG._1 (PRIOR ART)
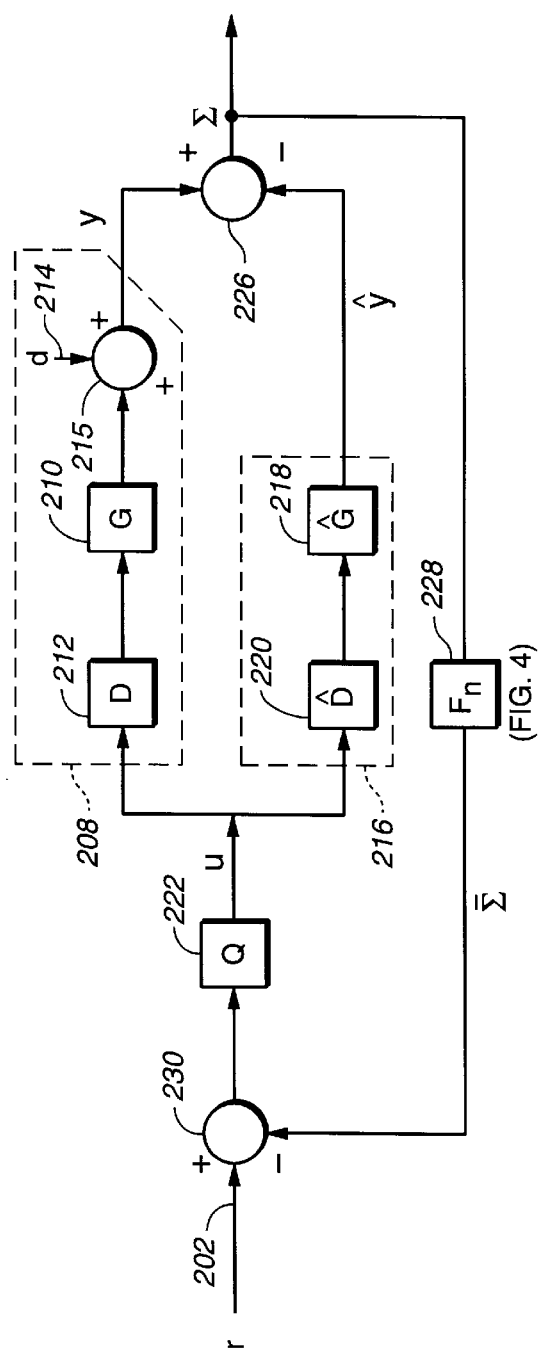
FIG._2

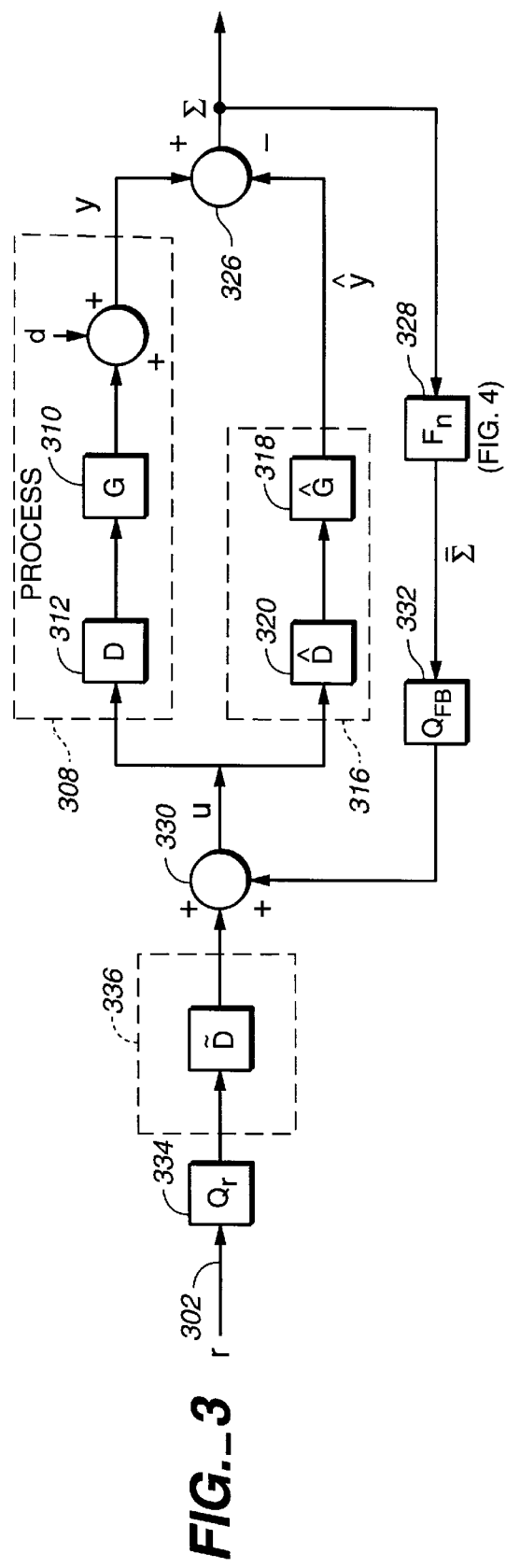
FIG._3
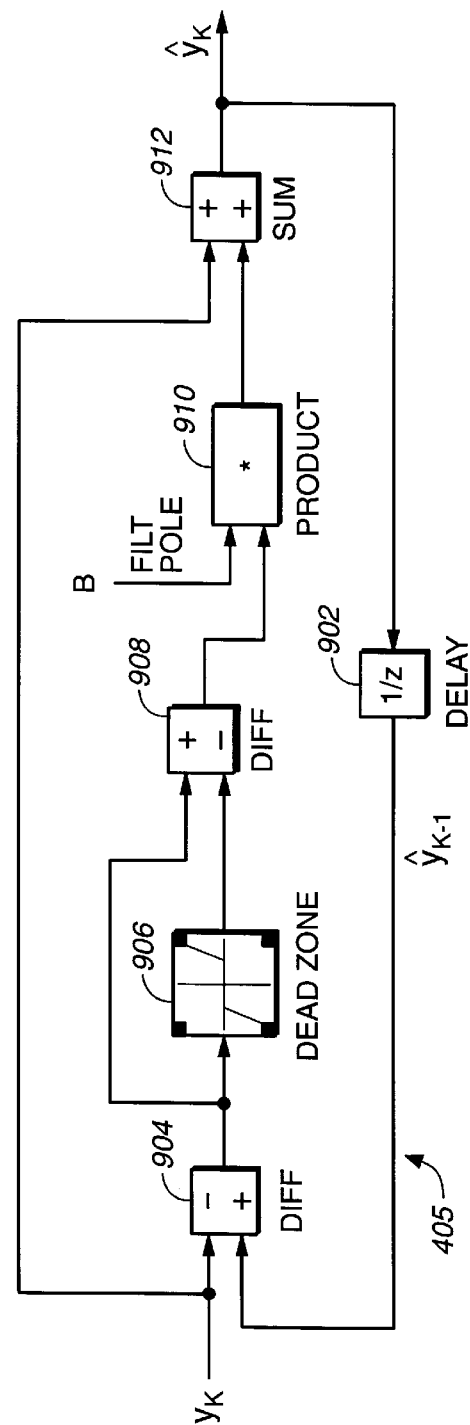
FIG._4A

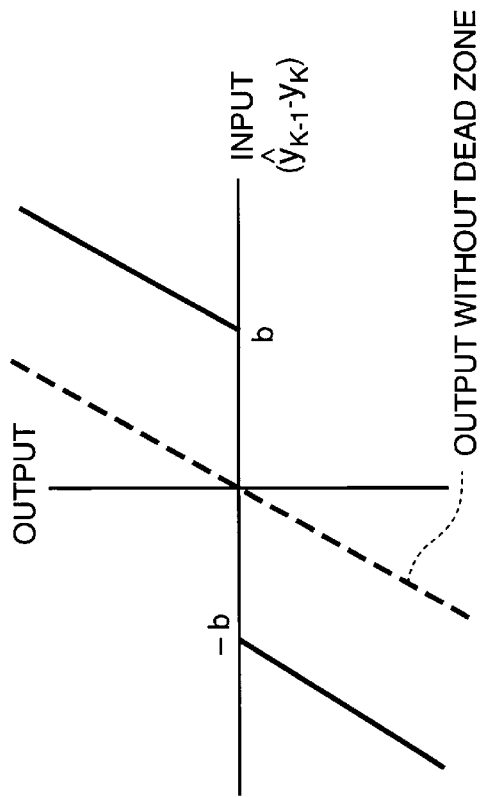
FIG._4B
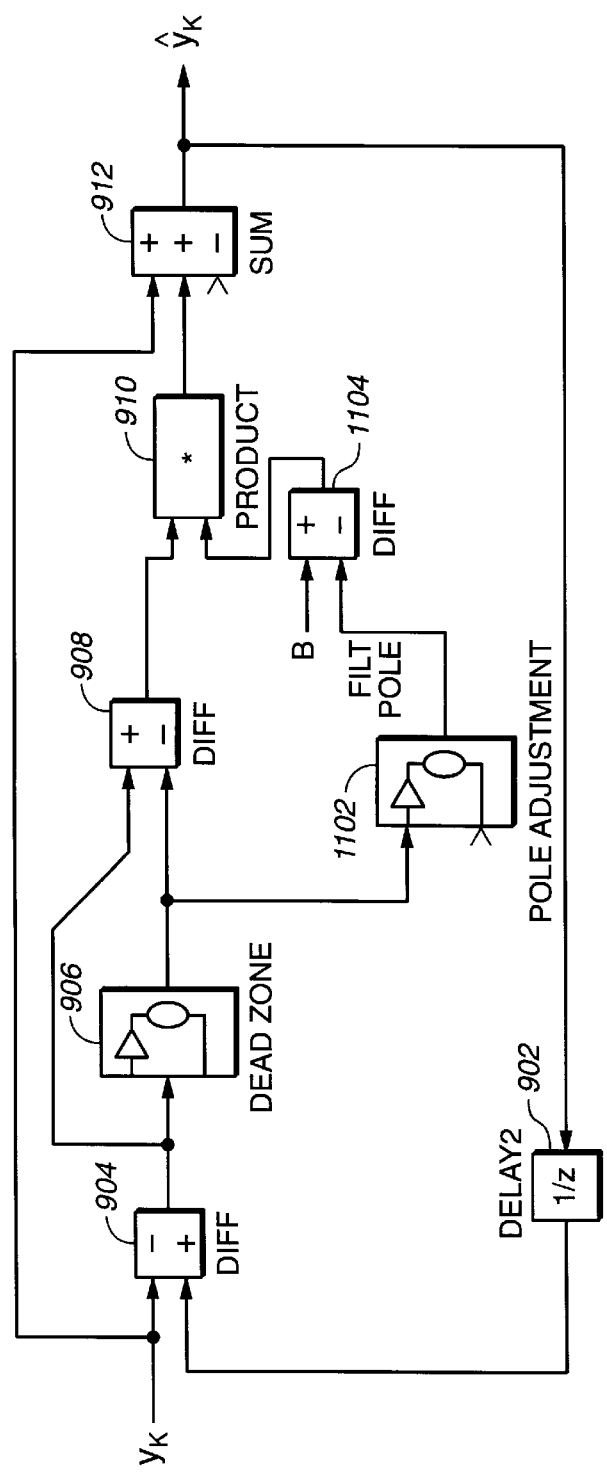
FIG._6

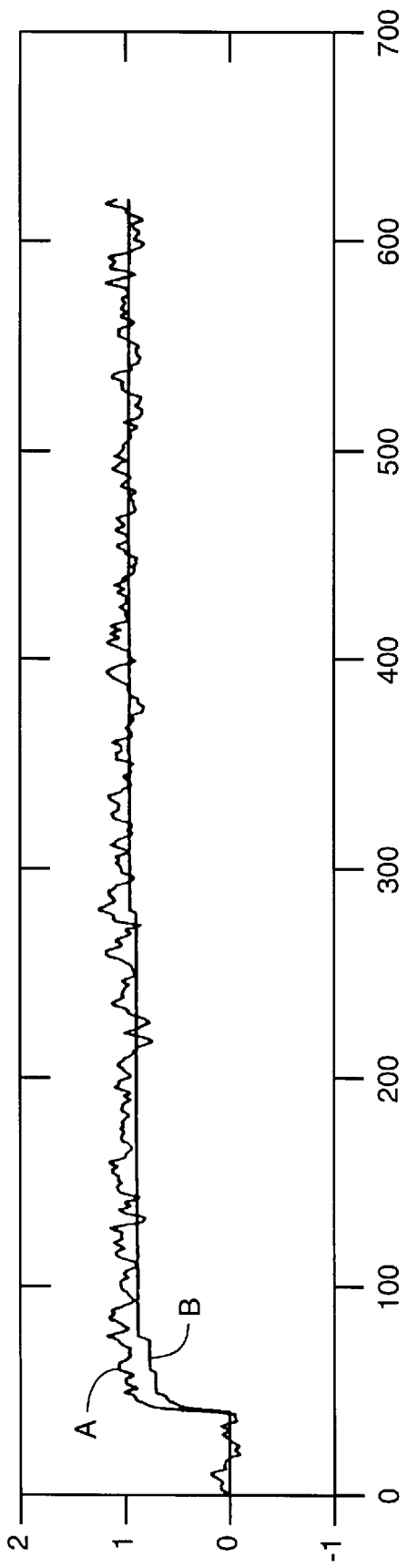
FIG._5A
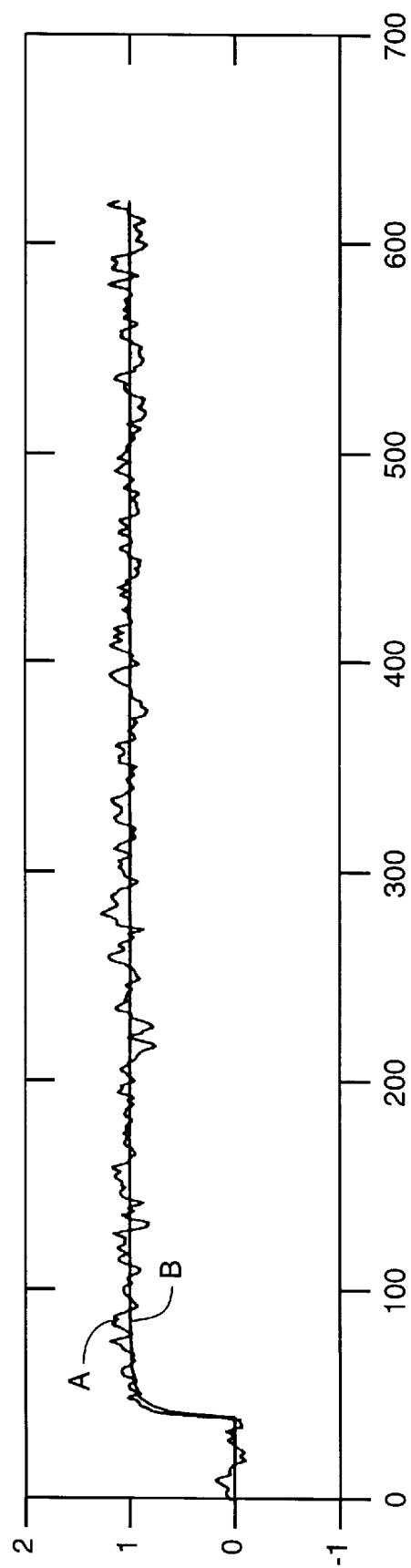
FIG._5B

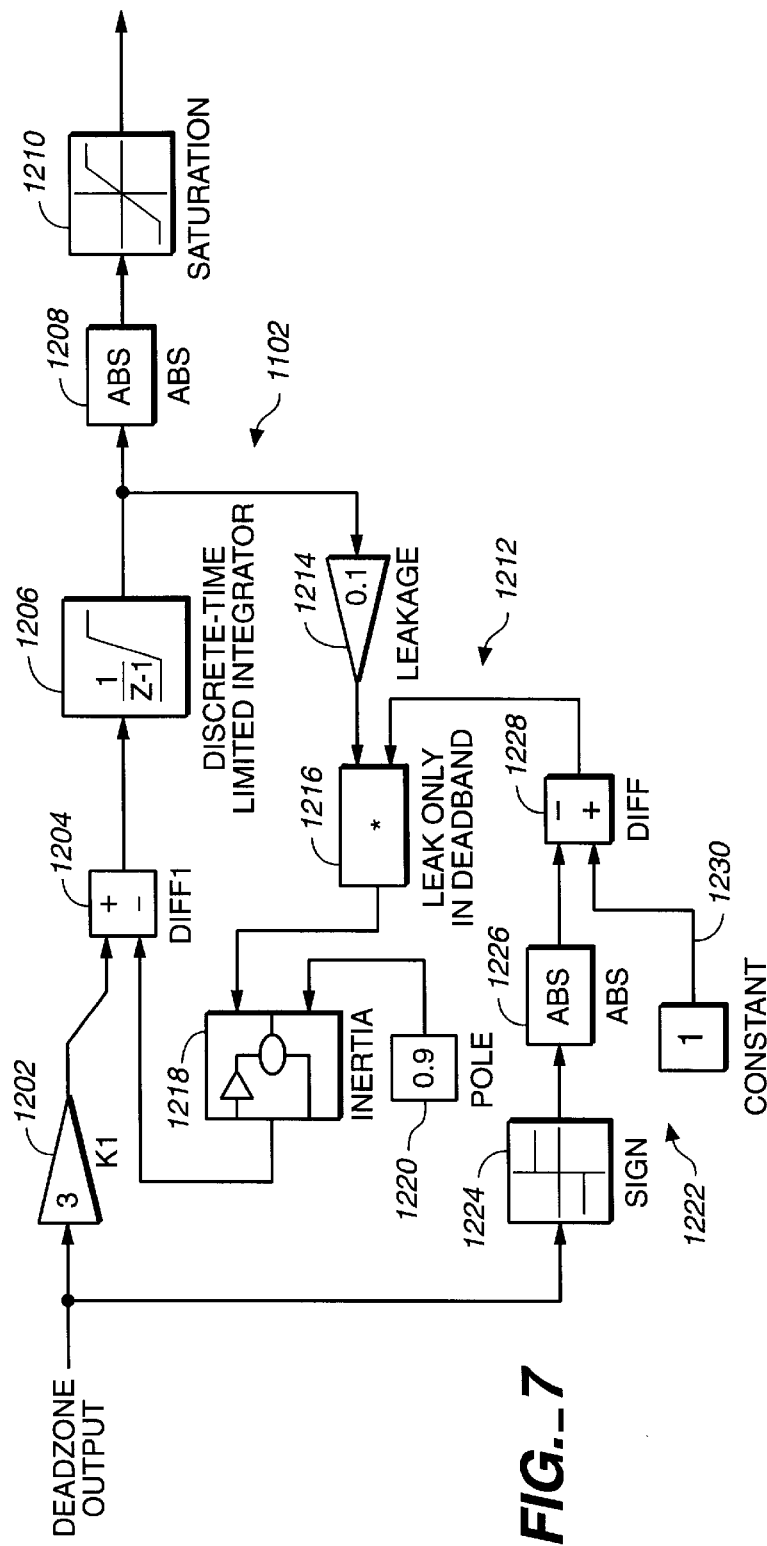
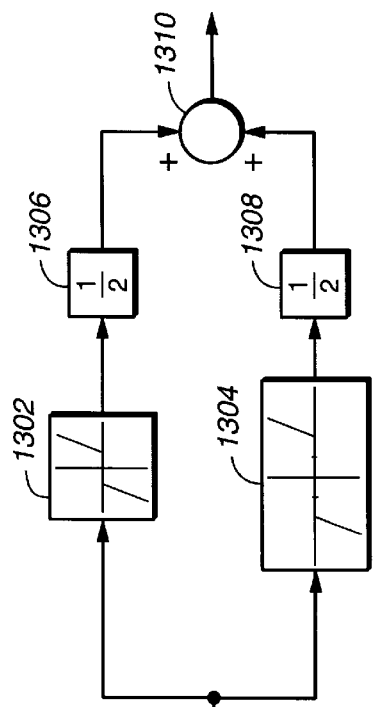
FIG._7
FIG._8

5,838,599

METHOD AND APPARATUS FOR NONLINEAR EXPONENTIAL FILTERING OF SIGNALS

BACKGROUND OF THE INVENTION

1. Field of the Invention

The present invention relates generally to signal processing, and more particularly, to the filtering of signals for use in control and signal processing systems.

2. State of the Art

In control and signal processing systems, it is highly desirable to achieve two seemingly conflicting objectives: (1) the rapid tracking of signal transients, such as step-like changes; and (2) heavy filtering of noise from the steady-state signal once the signal has settled following, for example, a response to a step change. The ability to accomplish both of these objectives can result in improved control and enhanced actuator life. However, in practice, a balance between these objectives has been deemed necessary to achieve acceptable control. More particularly, the filtering used in conventional control and signal processing systems has been largely implemented using linear filters, such as exponential filters and other low pass filters. These filters strive to reach a compromise between the objectives of rapidly tracking signal transients, and heavy filtering of noise during steady-state operation.

An example of a conventional control system wherein such linear filtering has been used to achieve the balanced compromise described above is illustrated in FIG. 1. In FIG. 1, a controller which incorporates a Smith Predictor as an internal model-based controller is illustrated. In the FIG. 1 illustration, a setpoint reference 102, labelled "r", is supplied to a three input comparator 104. An output of the comparator 104 is supplied to a controller 106. The controller includes an integration feature for addressing bias, and produces an output control signal labelled "u".

The control signal "u" is supplied to the control process represented by dashed lines 108. The process 108 can be considered to include two components: (1) the dynamic gain, or transfer function, component 110 labeled as a gain "G"; and a delay component 112 labelled "D". Because the process 108 is a real time process which is susceptible to environmental disturbances, an output from the dynamic gain component 110 is illustrated as being input to an adder 115 which receives an external disturbance component 114, labelled "d". The process output is a controlled variable labelled "y".

The FIG. 1 system includes a Smith Predictor, configured as an internal model 116 of the process 108. The internal model 116 is a theoretical model of the process 108. The internal model 116 is illustrated as including two components: (1) a model dynamic gain component 118 labelled "$\hat{G}$"; and (2) a model delay component 120 labelled "$\hat{D}$". The model dynamic gain component 118 produces a predicted value "$\hat{y}_{pred}$" of the control variable "y". This predicted value "$\hat{y}_{pred}$" constitutes a prediction of the value of "y" a set number of time units (e.g., $\hat{D}$ time units) into the future.

The model delay component 120 models the delay component 112, and produces an output labelled "$\hat{y}$" which is intended to be very close to the process output "y". In practice, where the external disturbance component "d" is negligible, the internal model 116 can be empirically developed to produce an output "$\hat{y}$" which is very close to the actual process output "y". Thus, the control signal "u" is supplied to two portions of the FIG. 1 illustration: (1) the actual process being controlled; and (2) the internal model, which receives the control signal in parallel with the process 108.

To determine an appropriate control signal "u", an inner feedback loop 122 is used. This inner feedback loop is intended to provide good control of the model dynamic gain "$\hat{G}$" 118 (without the delay component "$\hat{D}$"). That is, the output of "$\hat{G}$", namely, "$\hat{y}_{pred}$", will be well-behaved. The control signal, "u", used by the inner loop to generate "$\hat{y}_{pred}$" is simultaneously applied to the process 108 which will delay the control action by D time units. Since "$\hat{y}$" (i.e., the delayed version of well-behaving "$\hat{y}_{pred}$)", is expected to be close to the actual process output, "y", the actual process can be expected to be under good control.

The FIG. 1 controller also includes an outer feedback loop 124 which feeds back an error, or mismatch signal, labelled $\epsilon$. The mismatch signal $\epsilon$ is generated by comparing the actual process output "y" and the model output "$\hat{y}$" in a comparator 126. The mismatch signal $\epsilon$ is typically supplied to a low pass filter 128. The low pass filter 128 is configured with a cutoff frequency that corresponds to the desired bandwidth of process operation, and produces a filtered mismatch signal labelled $\bar{\epsilon}$. The filtered mismatch signal $\bar{\epsilon}$ is supplied to a comparator 130, wherein it is subtractively combined with a mismatch reference signal.

The purpose of outer feedback loop 124 is to include in the control signal "u" a corrective component reflecting the mismatch between the actual process output "y" and the model output "$\hat{y}$". Output mismatch occurs when the model 116 and the process 108 do not match, or when external disturbances "d" exist. The outer feedback loop can effectively correct for low-frequency mismatches such as a steady bias. However, often it cannot correct for high-frequency mismatches. In fact, high-frequency mismatches may be amplified by the outer feedback loop. This is because high frequency disturbances around a steady-state will likely take on very different values by the time the corrective control actions take effect on the delayed process response, thereby resulting in erroneous corrections. For this reason, a filter is typically used to heavily attenuate high-frequency "noise" components in the mismatch feedback signal. In the meantime, however, it highly desirable that the filtered feedback signal rapidly recognize and track real disturbance transients such as step-like changes or ramps.

The filter 128 is typically configured as an exponential filter, wherein the objectives of rapidly tracking signal transients (e.g., such as step changes of the controlled process due to a step change in the setpoint r) and heavy filtering of noise during steady-state operation are compromised. While such control has been deemed a necessary compromise in the past, it would be desirable to provide a filtering capability which can achieve both of the foregoing objectives without comprising either.

SUMMARY OF THE INVENTION

The present invention is directed to a method and apparatus for filtering a signal of a control and/or signal processing system in a manner which achieves both rapid tracking of signal transients (e.g., step changes in the signal) and heavy filtering of noise during steady-state operation. In accordance with exemplary embodiments, nonlinear features are combined with a conventional exponential filter to achieve both of these objectives. Exemplary embodiments are easy to use in a control and/or signal process system, and perform in a highly accurate manner. For example, in accordance with exemplary embodiments, a filter is configured with a deadband component which constitutes the sole user adjustable component of the filter.

Generally speaking, exemplary embodiments relate to a method and apparatus for filtering a signal comprising: means for receiving at least one input signal; means for establishing a dead zone within which a dead zone response to said input signal remains relatively constant; and means responsive to said dead zone response and said input signal for exponential filtering of said input signal.

BRIEF DESCRIPTION OF THE DRAWINGS

The present invention can be further understood with reference to the following description and the appended drawings, wherein like elements are provided with the same reference numerals. In the drawings:

FIG. 1 illustrates a conventional control system having a filter included therein;

FIG. 2 illustrates an exemplary control system in accordance with the present invention, wherein filtering in accordance with the present invention used;

FIG. 3 illustrates an alternate exemplary control system using filtering in accordance with the present invention;

FIGS. 4A and 4B illustrate exemplary embodiments of a nonlinear exponential filter in accordance with the present invention;

FIGS. 5A and 5B illustrate waveforms associated with various embodiments of a filter in accordance with the present invention;

FIG. 6 illustrates an alternate exemplary embodiment of a nonlinear exponential filter in accordance with the present invention;

FIG. 7 illustrates an exemplary embodiment of a pole adjustment feature included in the exemplary FIG. 6 embodiment; and FIG. 8 illustrates an alternate exemplary embodiment of a dead zone for use in a filter according to the present invention.

DETAILED DESCRIPTION OF THE PREFERRED EMBODIMENTS

FIG. 2 illustrates an exemplary control system wherein an input is provided for receiving at least one setpoint reference signal 202, labelled "r". As those skilled in the art will appreciate, the setpoint reference 202 can be a scalar or vector value. For example, the setpoint reference "r" can include setpoints for any number of controlled variables.

Where the control system is used, for example, to control a paper making process, the setpoint reference can include any one or more parameters associated with the control of that process. Controlled variables typically associated with a paper making process include, for example, basis weight, moisture content and ash.

The setpoint reference 202 is processed into a control signal "u" (which can also be a scalar or vector value) via an inner feedback loop 222, labelled "Q". The inner feedback 222 generally corresponds to the inner feedback loop 122 of FIG. 1, but for the sake of simplicity has been represented as block "Q". The inner feedback loop 222 thus includes a controller in the forward path. The forward path is in parallel with a feedback loop having a model dynamic gain component included therein. Thus, the inner feedback loop 222 can be considered to include controller 106 of FIG. 1 in parallel with a feedback path that includes the model dynamic gain component 118. A comparator, such as comparator 104 of FIG. 1, is also included in the inner feedback 222 for subtractively combining the output of the model dynamic gain component 118 with the setpoint-derived input to the inner feedback loop 222 (note that the setpoint-derived input to the inner feedback loop 222 is the output of a comparator 230). As with loop 122 in the FIG. 1 embodiment, the inner feedback loop 222 excludes the time delay component in the loop, and therefore provides relatively immediate response to changes in the control signal "u", to thereby reduce the potential occurrence of oscillations.

As with the FIG. 1 control system, the control system of FIG. 2 supplies the control signal "u" to two locations: (1) the process 208 to be controlled; and (2) an internal model 216 used to model the process. The process 208 can be considered to include a dynamic gain component 210 and a delay component 212, as well as an external disturbance component 214 labelled "d" (which is graphically illustrated as being input to the process via an adder 215). The process 208 produces the process output signal "y".

The internal model 216 includes a model dynamic gain component 218 and a model delay component 220. As those skilled in the art will appreciate, the model dynamic gain component 218 which is included in the internal model 216 is the same model dynamic gain component which is incorporated in the inner feedback loop 222. That is, the model dynamic gain component is included in both the internal model 216 and the inner feedback loop 222 to simplify the following discussion by enabling better correlation of the FIG. 2 embodiment to an alternate embodiment of FIG. 3. Of course, if desired, the inner feedback loop 222, the process 208 and the internal model 216 can be illustrated in the manner shown in FIG. 1. The internal model 216 of FIG. 2, like that of FIG. 1, produces the predicted process output signal "$\hat{y}$".

A filtered mismatch signal, "$\bar{\epsilon}$" is produced as the feedback signal for the outer loop. Since it is highly desirable to filter the mismatch signal in a manner which does not require compromising between the objectives of (1) rapidly tracking signal transients, and (2) heavily filtering noise during steady-state, a nonlinear exponential filter 228, labelled "$F_n$," can be included in the FIG. 2 control system. The filter 228 receives a mismatch signal produced by a comparator 226, and supplies the filtered mismatch signal to comparator 230 where it is subtractively combined with the setpoint reference 202.

Of course, those skilled in the art will appreciate that the use of a nonlinear exponential filter in the general configuration of the FIG. 2 control system is by way of example only, and that numerous variations exist. For example, an alternate control system which is a suitable candidate for use of filtering in accordance with the present invention will be described with respect to FIG. 3. FIG. 3 illustrates a variation of the FIG. 2 control system wherein a two degree-of-freedom internal model-based control is incorporated into the control system. A two degree-of-freedom internal model-based control system is, for example, described in co-pending U.S. application Ser. No. 08/713,461 entitled "METHOD AND SYSTEM FOR CONTROLLING A MULTIPLE INPUT/OUTPUT PROCESS WITH MINIMUM LATENCY" and filed Sep. 13, 1996, the contents of which are hereby incorporated by reference in their entirety.

Exemplary embodiments of a two degree of freedom internal model-based controller separate the components included in the inner feedback 222 of FIG. 2 into two separate control functions: (1) a first control function 334 labelled "$Q_r$" for controlling system response to changes in the setpoint reference "r"; and (2) a second control function 332 labelled "$Q_{FB}$" for responding to changes in the feedback signal $\epsilon$. As described in the aforementioned co-pending application, a delay unifier 336 labelled "$\overline{D}$" is used to unify the delays associated with the multiple input variables when the setpoint reference 302 is configured as a vector. As described in the co-pending application, the delay unifier introduces a delay to the control variable of the setpoint reference 302 having the shortest delay to render it comparable to the delay associated with the control variable of the setpoint reference 302 having the longest delay. In other words, as a result of the delay unifier 336, all controlled variables will have substantially the same delay associated with them, to render processing in the internal model 316 permutable (i.e., linear).

The exact manner in which the delay unifier operates does not form a portion of the present invention, and a more detailed description of this component can be obtained from the co-pending application mentioned above. However, it will be appreciated by those skilled in the art that because the delay unifier is specifically included to unify the delays associated with multiple input variables, all of the control and delay functions are configured as matrices.

As illustrated in FIG. 3, an adaptive predictor 328 receives the mismatch signal $\epsilon$ and produces a nonlinearly filtered signal $\bar{\epsilon}$. However, rather than feeding the filtered feedback signal directly to a comparator for subtractive combination with a setpoint reference, the adaptive prediction feedback signal is fed through controller 332, labelled "$Q_{FB}$", of the feedback path.

Another exemplary use of the nonlinear exponential filter is in a configuration similar to those in FIG. 2 and FIG. 3, but where the filter blocks 228 and 328 are replaced by an adaptive predictive filtering function "F+". Here, the corrective control action is based on a predicted mismatch signal in such a manner that after being delayed by the process delay, "D", the effect of the corrective action will largely cancel out an effect of a future mismatch. This control scheme can very significantly reduce any repetitive, predictable components in the disturbance, and thereby reduce higher frequency and overall process variations. The nonlinear exponential filter "$F_n$" can be used as a part of the adaptive predictor, "F+". The nonlinear filter, "$F_n$" establishes a very stable estimate of the process steady-state, thereby allowing process variations around steady-state to be projected by the adaptive prediction component of the adaptive predictor "F+". When an unpredictable transient (e.g., step-like change) occurs, the nonlinear filter "$F_n$" will rapidly track the signal change. During normal steady-state operations, however, the nonlinear filter "$F_n$" will ignore the process variations and allow the adaptive predictor to predict the process variations around the current steady-state values. More detailed discussion of the adaptive predictor can be found in copending U.S. application Ser. No. 08/713,863, entitled "Method and Apparatus for Controlling a Process Using Adaptive Prediction Feedback", by K. Mike Tao and Ramesh Balakrishnan, filed on Sep. 13, 1996, the contents of which are hereby incorporated by reference in their entirety. As described therein, the adaptive predictor can be implemented to use a least mean square stochastic approach well known in adaptive signal processing and described for example in B. Widrow and S. Stearns, "Adaptive Signal Processing", Prentice Hall, 1985; or a normalized least mean square processing as described in G. C. Goodwin and K. S. Sin, "Adaptive Filtering, Prediction and Control", Prentice Hall, 1984, the contents of which are hereby incorporated by reference in their entireties.

In addition, those skilled in the art will appreciate that any other prediction-based methodologies can be implemented. For example, any statistical processing algorithm readily available in the art can be used as well, including the recursive least squares approach as described in the Goodwin et al document mentioned previously, and including alternate approaches as described in K. M. Tao, "Statistical Averaging and PARTAN—some alternatives to LMS and RLS," IEEE Int. Conf. Acoustics, Speech and Signal Processing, 1992, pp. IV-25–IV-28.]

Non-Linear Exponential Filter

A more detailed account of the nonlinear exponential filter will now be provided. In FIG. 4A, an input labelled "$y_K$" represents the signal to be filtered, while an output of the filter is labelled "$\hat{y}_K$". The output from the filter is passed through a delay 902 (e.g., a one unit delay) to produce a delayed version of "$\hat{y}_K$" as the signal "$\hat{y}_{K-1}$".

In the exemplary FIG. 4A embodiment, (excluding block 906) the filter is configured to implement the equation:

$$\hat{y}_k = \beta(\hat{y}_{k-1} - y_k) + y_k$$

This equation corresponds to an implementation of the well-known exponential filter. To implement the foregoing equation, the input "$y_K$" and the feedback signal "$\hat{y}_{K-1}$" are supplied to a comparator 904 to produce a difference between the two signals. However, in contrast to a conventional exponential filter, the exemplary filter of FIG. 4A includes a dead zone 906. The dead zone, in accordance with exemplary embodiments, is configured to produce a relatively constant (e.g., zero) output when the differential output of comparator 904 is within a given deadband, while applying gain to the differential output of comparator 904 when the difference is outside of the dead zone.

FIG. 4B illustrates an exemplary transfer function of the dead zone 906. As illustrated in FIG. 4B, when the differential output of comparator 904 is in a deadband defined by −b to b, the output from the dead zone is zero. However, when the differential output of comparator 904 is outside the deadband, the output from the dead zone basically follows the differential input with a lag that corresponds to b (or −b for negative outputs of comparator 904). As a result of this function, the filter 405 will respond to transients, such as those which occur during a step transition, so that changes in steady-state can be rapidly tracked, but will largely ignore small variations around steady-state.

As those skilled in the art will appreciate, since the deadband width is the sole parameter of the nonlinear exponential filter which is user adjusted in accordance with exemplary embodiments of the present invention, the filter is very easy to use. The deadband can be determined on the basis of control quality requirements associated with the particular control and/or signal processing system within which the filter is included. Alternately, the bandwidth of the deadband can be estimated on-line. One such on-line adjustment is outlined below.

In accordance with an exemplary embodiment, an on-line estimate of signal variations can be used to adjust the bandwidth of the deadband. More particularly, where the signal variations are represented as $\sigma$ and an estimate to the signal variations is represented as $\hat{\sigma}$, the on-line estimate signal variations can be determined as follows:

$$\sigma = E[(x - \bar{x})^2]$$

$$\hat{\sigma} = Avg[x - \bar{x})^2]$$

where: x=signal; $\bar{x}$=(unknown) signal mean; EE[ ]= statistical expectation; Avg[ ]=averaging.

A dynamic estimate can be based on measurement of consecutive process variations, using an exponential filter, without estimating the signal mean $\bar{x}$, as follows:

$$\hat{\sigma}_c^2 = Avg[x_k - x_{k-1})^2]$$
$$= Avg[((x_k - \bar{x}) - (x_{k-1} - \bar{x}))^2]$$
$$\approx 2Avg[(x_k - \bar{x}^2)] - 2Avg[(x_k - \bar{x}) \cdot (x_{k-1} - \bar{x})] \rightarrow 2\hat{\sigma}^2$$

if $(x_k=\bar{x})$ and $(x_{k-1}-\bar{x})$ are random, uncorrelated.

As those skilled in the art will appreciate, rather than using consecutive process variations, a running range estimator can be used to replace $\hat{\sigma}_c$ as often found in statistical quality control practice.

In FIG. 4A, a comparator 908 subtractively combines the output from the dead zone with the differential output of comparator 904. Thus, the larger the output from the dead zone 906, the smaller the output from the comparator 908.

The output from comparator 908 is supplied to a multiplier 910, wherein it is multiplied with a filter coefficient β. Note that the filter coefficient β constitutes a coefficient of the conventional exponential filter set forth in the foregoing equation. As those skilled in the art will appreciate, the value of β is set at a value between zero and 1. For a β which is closer to one, very stable steady-state tracking can be provided with the filter. However, for a β which is closer to zero, the filter is better configured for tracking faster changes.

Referring to the equation above, it is apparent that for a β that is approximately 1, the filter output will weigh the prior filter output "$\hat{y}_{K-1}$" more heavily in the equation, whereas for a β approximately equal to zero, the current input signal "$y_K$" which is to be filtered is weighted more heavily. In this latter case, the filter can be considered to have a short memory which is effected by the current input. In contrast, for a β of approximately 1, the filter can be considered to have a long memory since it weights the prior filtered output signal more heavily.

The output from the multiplier 910 is supplied to an adder 912, wherein the output from the multiplier 910 is combined with the input signal "$y_K$" to implement the equation mentioned above.

The use of a nonlinear exponential filter in accordance with the exemplary FIG. 4A embodiment provides rapid response in tracking signal transients, while also providing heavy filtering of noise during steady-state operation. These features are reflected in FIG. 5A wherein waveform "A" corresponds to the input signal to the FIG. 4A filter, while waveform "B" corresponds to the output from the filter. As illustrated therein, the filter output rather rapidly tracks a change in steady-state, yet provides heavy filtering of high frequency noise components included in the filter input signal. In addition, the filter output eventually settles around the steady-state of the input signal, thereby providing precise steady-state control without including any high frequency noise component therein. Units used to designate both the horizontal time axis and the vertical amplitude axis in FIG. 104 are arbitrary units. Notice, however, the initial rapid tracking displayed in FIG. 5A slows down as the input signal reaches a new steady-state. Consequently, it takes a while for the filter to reach an accurate estimate of the new steady-state. This is because in FIG. 4A, the output of block 904 falls back into the dead zone of block 906 after the initial fast tracking response.

Having described an exemplary embodiment of a nonlinear exponential filter with respect to FIGS. 4A, 4B and 5A, an alternate exemplary embodiment of such a filter will now be described with respect to FIGS. 5B, 6, 7 and 8. Referring to FIG. 6, components of the filter which are comparable to those of FIG. 4A are similarly labelled. However, in addition to the components of the FIG. 4A embodiment, the FIG. 6 embodiment further includes a means for adjusting the filter coefficient β to further optimize filter performance.

More particularly, the output from the dead zone 906 is supplied to a pole adjustment block 1102. Based on the magnitude of the output from dead zone 906, pole adjustment block 1102 produces an input to an adder 1104. The adder 1104 differentially combines the output from the pole adjustment block with the filter coefficient β to modify the value of the filter coefficient which is used by multiplier 910. By adaptively modifying the effective value of the filter coefficient β which is used by multiplier 910, the filter can be configured to track faster changes of the input signal when such changes are occurring, yet provide improved steady-state response during steady-state conditions of the filter input signal $y_k$. More importantly, short-term memory is provided by the pole adjustment block 1102 such that the filter will remain in fast tracking mode for a predetermined short period even after the fast tracking condition has been removed.

An illustration of how the filter coefficient β is modified in accordance with the exemplary pole adjustment block 1102 is set forth in FIG. 7. In FIG. 7, the dead zone output is supplied to a gain component 1202 whereby a nonzero output of the dead zone is multiplied by an integral gain labelled "KI". The output from the gain component 1202 is supplied to an adder 1204, whose output in turn is supplied to a discrete-time limited integrator 1206.

The output of the discrete-time limited integrator serves as a memory element for integrating the output of adder 1204. The discrete-time limited integrator is supplied to an absolute value block 1208 to ensure that an output of the pole adjustment block 1102 is always positive, so that this output can be subtracted from the unadjusted value of the filter coefficient β. Further, the pole adjustment block 1102 includes a saturation block 1210 which ensures that the output from the pole adjustment block will never exceed the value of the filter coefficient β (or a smaller set value). That is, the use of the absolute value block 1208 in conjunction with the saturation block 1210 ensures that when the output from the pole adjustment block 1102 is subtractively combined with the filter coefficient β in adder 1104 of FIG. 6, the output will remain between zero and 1, (or alternately, between a set positive fraction and 1).

In operation, when the dead zone 906 is not triggered, the pole adjustment block 1102 will typically do nothing to adjust the filter coefficient "β". The filter will remain in the steady-state mode and provide a very stable estimate of the signal steady-state.

However, when the dead zone 906 is triggered (i.e., exceeded), as is the case during signal transients, the integrator 1206 of the pole adjustment block 1102 will start to integrate (i.e., memorize) and to effect filter pole adjustment via adder 1104. The result is faster tracking during signal transients. Because of the memory capability, the filter will remain in a fast tracking mode even after the transient condition has been removed. This will assure that the filter output will quickly reach the neighborhood of the new signal steady-state. To stabilize in the new steady-state (i.e., ignore signal variations around it), however, the filter needs to transition back to the steady-state mode within a (predetermined) short period of time. This is accomplished using a memory leakage process.

More particularly, in the exemplary FIG. 7 embodiment, the predetermined period of time during which the output of the pole adjustment block is set to a relatively high value to reduce β close to zero is established using a feedback path 1212. The feedback path 1212 receives the output from the discrete-time limited integrator 1206. A leakage block 1214 captures 1/10th (i.e., 0.1) of the current output value of the discrete-time limited integrator, and supplies it to a multiplier 1216. The multiplier 1216 ensures that the feedback path is operative only during times when a dead zone output exists. Accordingly, the multiplier 1216 possesses a value of 1 during operation outside the deadband zone, and possesses a value of zero when operation is within the deadband. Thus, during operation outside the deadband, the leakage factor from leakage block 1214 is supplied through the multiplier 1216 to an inertia block 1218.

The inertia block 1218 includes a first order time constant which prevents the leakage factor from causing a step change at the output of adder 1204. Rather, by introducing a time constant to the leakage factor, the leakage factor is smoothed out over a period of time proportional to the time constant so that a gradual implementation of the 10% leakage factor is applied at the adder 1204.

A pole input 1220 is provided to the inertia block 1218. The pole input is used to set the amount of inertia used to smooth out the leakage factor. In the exemplary embodiment illustrated in FIG. 7, the pole input is set to 0.9 so that it will take approximately 10 time increments for the entire leakage factor to be subtracted from the amplified dead zone output which is supplied to the positive input of adder 1204.

As mentioned previously, the multiplier 1216 is set to a 1 when a nonzero dead zone output exists. In order to detect when operation is occurring outside the dead zone, a feedforward loop 1222 is included in the pole adjustment block 1102. More particularly, the dead zone output is supplied to a sign detection block 1224. The output of sign detection block 1224 is supplied to an absolute value block 1226, which in turn is supplied to an adder 1228. The adder 1228 also receives a user set constant 1230. The constant (=1) on signal path 1230 and the output from the absolute value block 1226 are subtractively combined in the adder 1228 as an indication of whether the dead zone output is within the dead zone (i.e., zero output) or outside the dead zone (i.e., nonzero output).

In operation, when a nonzero output of the dead zone exists, the discrete-time limited integrator builds up a charge to decrease the filter coefficient β. Such operation ensures faster tracking during the transient changes of the input signal to the filter and remains fast for a predetermined period of time which is set by the feedback path 1212. That is, a portion of the output from the discrete-time limited integrator, represented as the leakage factor is, over the predetermined period of time, subtracted from the dead zone output to reduce the charge in the discrete-time limited integrator, and gradually allows the value of β to return to its steady-state tracking value (i.e., closer to one).

FIG. 5B illustrates an exemplary waveform output from a filter in accordance with FIG. 6 embodiment. As illustrated therein, a faster tracking of a transient change can be realized as compared with the FIG. 5A illustration. Further, a faster settling of the filter output at a steady-state is realized with the FIG. 6 embodiment.

In accordance with another alternate exemplary embodiment of a filter in accordance with the present invention, the dead zone 906 of FIG. 4A and of FIG. 6 can be reconfigured as shown in FIG. 8. The exemplary dead zone illustrated in FIG. 8 provides smoother transitions and greater ease of deadband bandwidth selection by including two dead zones 1302 and 1304 in parallel. As illustrated in FIG. 8, the bandwidth of each of the two dead zones can be independently selected. Of course, any number of such dead zones can be used. The selection of the various bandwidths can be performed in a manner similar to that described with respect to FIG. 4A. However, as will be apparent to those skilled in the art, the use of two different dead zones will require the selection of two different bandwidths.

The outputs from the dead zones 1302 and 1304 are supplied to dividers 1306 and 1308. The dividers extract, in this example, ½ of the output from each dead zone. The outputs from the dividers 1306 and 1308 are then combined in an adder 1310 to produce a composite dead zone output, which can be used in conjunction with the embodiments described previously.

As those skilled in the art will appreciate, any or all of the components described above can be implemented in digital and/or analog circuitry. Further, any of the functionality described can be implemented in a processor, such as any readily available digital signal processor or processors.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for filtering a signal comprising:

means for receiving at least one input signal;

means for establishing a dead zone within which a dead zone response to said input signal remains relatively constant; and means responsive to said dead zone response and said input signal for exponential filtering of said input signal.

2. Apparatus according to claim 1, wherein said dead zone establishing means further includes:

a first dead zone having a first bandwidth; and a second dead zone having a second bandwidth different from said first bandwidth.

3. Apparatus according to claim 1, further comprising:

a first adder for receiving said at least one input signal and for receiving a delayed output of said apparatus, an output of said first adder being supplied to said dead zone establishing means.

4. Apparatus according to claim 3, further comprising:

a second adder for combining an output of said dead zone establishing means with the output of said first adder.

5. Apparatus according to claim 4, further comprising:

means for multiplying an output of said second adder with a filter coefficient.

6. Apparatus according to claim 5, further comprising:

means for adjusting said filter coefficient in response to an output of said dead zone establishing means.

7. Apparatus according to claim 6, wherein said means for adjusting said filter coefficient further includes:

at least one discrete-time integrator for integrating said output of said dead zone establishing means.

8. Apparatus according to claim 7, wherein said means for adjusting said filter coefficient further includes:

a feedback path for subtractively combining at least a portion of an output from said discrete-time integrator from an input of said discrete-time integrator.

9. Apparatus according to claim 8, wherein said feedback path further includes:

means for introducing a time constant to said at least a portion of said discrete-time integrator output which is subtractively combined with said dead zone output.

10. Method for filtering a signal comprising the steps of:

receiving at least one input signal;

establishing a dead zone within which a dead zone response to said input signal remains relatively constant; and exponentially filtering said input signal in response to said dead zone response and said input signal.

11. A method according to claim 10, wherein said step of establishing further includes the steps of:

establishing a first dead zone having a first bandwidth; and establishing a second dead zone having a second bandwidth different from said first bandwidth.

12. A method according claim 10, further comprising the step of:

adding said at least one input signal and a delayed output produced in response to said at least one input signal, a result of said adding step being used to produce said dead zone response.

13. A method according to claim 12, further comprising the step of:

combining said dead zone response with the result of said adding step.

14. A method according to claim 13, further comprising the step of:

multiplying an output of said combining step with a filter coefficient.

15. A method according to claim 14, further comprising the step of:

adjusting said filter coefficient in response to a said dead zone response.

16. A method according to claim 15, wherein said step of adjusting said filter coefficient further includes the step of:

integrating said dead zone response.

17. A method according to claim 16, wherein said step of adjusting said filter coefficient further includes the step of:

subtractively combining at least a portion of an output from said step of integrating from an input to said step of integrating.

18. A method according to claim 19, wherein said step of adjusting further includes the step of:

introducing a time constant to said at least a portion of said output which is subtractively combined with said input to said step of integrating.

* * * * *